US012416187B2

(12) United States Patent
Bekendam et al.

(10) Patent No.: US 12,416,187 B2
(45) Date of Patent: Sep. 16, 2025

(54) CONTROL ARRANGEMENT FOR OPERATING A MOTOR VEHICLE LOCKING SYSTEM

(71) Applicant: Brose Fahrzeugteile SE & Co. Kommanditgesellschaft, Bamberg, Bamberg (DE)

(72) Inventors: Rene Bekendam, Remscheid (DE); Alexander Mueller, Bischberg (DE)

(73) Assignee: Brose Fahrzeugteile SE & Co. Kommanditgesellschaft, Bamberg, Bamberg (DE)

( * ) Notice: Subject to any disclaimer, the term of this patent is extended or adjusted under 35 U.S.C. 154(b) by 70 days.

(21) Appl. No.: 18/294,026

(22) PCT Filed: Aug. 2, 2021

(86) PCT No.: PCT/EP2021/071579

§ 371 (c)(1),
(2) Date: Jan. 31, 2024

(87) PCT Pub. No.: WO2023/011700

PCT Pub. Date: Feb. 9, 2023

(65) Prior Publication Data

US 2024/0344373 A1 Oct. 17, 2024

(51) Int. Cl.
*E05B 81/86* (2014.01)
*E05B 81/14* (2014.01)

(52) U.S. Cl.
CPC .............. *E05B 81/86* (2013.01); *E05B 81/14* (2013.01)

(58) Field of Classification Search
CPC ................................. E05B 81/14; E05B 81/86
(Continued)

(56) References Cited

U.S. PATENT DOCUMENTS 11,984,752 B2 * 5/2024 Wiggins .................. H02P 29/60
12,146,351 B2 * 11/2024 Konrad ................... E05B 81/64
(Continued)

FOREIGN PATENT DOCUMENTS

DE 102019134801 6/2021
EP 2837757 2/2015

OTHER PUBLICATIONS

"International Search Report and Written Opinion," for PCT Application No. PCT/EP2021/071579 mailed Apr. 29, 2022 (12 pages), no English translation.

*Primary Examiner* — Kristina R Fulton
(74) *Attorney, Agent, or Firm* — Pauly, DeVries Smith & Deffner LLC

(57) ABSTRACT

A control arrangement for operating a locking system having an electric drive. During normal operation the electric drive is fed by a normal supply voltage in order to provide a motorized locking function for an adjustable closing element. The control arrangement has an energy storage arrangement having at least one energy store in the form of a capacitor. In an emergency operating mode the energy storage arrangement makes available an energy storage voltage. A main boost stage is connected downstream of the energy store. The energy storage voltage is applied to an input of the main boost stage in the emergency operating mode and the main boost stage boosts the energy storage voltage to the emergency supply voltage. An auxiliary boost stage to also be connected downstream of the energy store and to be able to be connected upstream of the main boost stage.

14 Claims, 2 Drawing Sheets

(58) Field of Classification Search
USPC .......................................................... 292/201
See application file for complete search history.

(56) References Cited

U.S. PATENT DOCUMENTS

| | | | | |
|---|---|---|---|---|
| 2015/0330116 | A1* | 11/2015 | Dente | B60L 58/15<br>307/10.1 |
| 2017/0107747 | A1* | 4/2017 | Dente | E05B 81/86 |
| 2017/0341526 | A1* | 11/2017 | Marlia | B60L 58/15 |
| 2020/0263460 | A1* | 8/2020 | Kageyama | H02J 7/0068 |
| 2021/0301561 | A1* | 9/2021 | Cumbo | E05F 15/622 |
| 2022/0094196 | A1* | 3/2022 | Chen | H02J 7/345 |
| 2022/0195761 | A1* | 6/2022 | Trescases | H02J 9/06 |
| 2022/0282530 | A1* | 9/2022 | Leonardi | E05B 81/06 |
| 2023/0126606 | A1* | 4/2023 | Bekendam | E05B 81/86<br>292/201 |
| 2024/0318474 | A1* | 9/2024 | Pohl | E05B 81/82 |
| 2024/0344373 | A1* | 10/2024 | Bekendam | E05B 81/14 |

* cited by examiner

CONTROL ARRANGEMENT FOR OPERATING A MOTOR VEHICLE LOCKING SYSTEM

CROSS-REFERENCE TO RELATED APPLICATIONS

This application is a national stage application under 35 U.S.C. 371 of International Patent Application Serial No. PCT/EP2021/071579, entitled "Control Arrangement for Operating a Motor Vehicle Locking System," filed Aug. 2, 2021, the disclosure of which is incorporated herein by reference.

FIELD OF THE TECHNOLOGY

Various embodiments relate to a control arrangement for operating a motor vehicle locking system, to a motor vehicle locking system and to a method for operating a motor vehicle locking system.

BACKGROUND

The known control arrangement (US 2015/0330116 A1) from which some embodiments proceed relates to the operation of a motor vehicle locking system having a motor vehicle lock that has a lock latch and a pawl as locking elements. The lock latch is able to be brought into a locking position in which it is in holding engagement with the locking part and in which it is fixed by the pawl. The motor vehicle lock is furthermore equipped with an electric drive, by way of which the pawl is able to be lifted, such that the lock latch, releasing the locking part, is able to be moved into its open position.

In order to be able to take into consideration the requirements in terms of the safety of the voltage supply for such motor vehicle locks, the known control arrangement has a chargeable energy storage arrangement, as a result of which the electrical energy supply to the motor vehicle locking system is ensured via an emergency supply voltage even in an emergency operating mode, in particular in the event of failure of the normal supply voltage.

The energy storage arrangement of the known control arrangement is formed by capacitors. Since individual capacitors are limited in terms of the voltage they provide, multiple capacitors are electrically connected in series to provide the emergency voltage supply. In addition, in the known control arrangement, provision is made for a boost stage for the energy storage arrangement in order to achieve the required emergency supply voltage starting from the energy storage voltage.

The problem here however is that the series-connected capacitors have a disadvantageous effect both on installation space requirements and on the production costs of the control arrangement. The series-connected capacitors additionally generally require a balancing circuit in order to ensure uniform charging of the capacitors, which likewise leads to a more complex structure of the control arrangement.

SUMMARY

Various embodiments are based on the problem of configuring and developing the known control arrangement in such a way that further optimization is achieved with regard to the mentioned challenge.

The above problem is solved, in a control arrangement according to embodiments disclosed herein.

The motor vehicle locking system in question applies to all types of motorized locking functions for closing elements of a motor vehicle. These include in particular closing elements such as side doors, rear doors, tailgates, trunk lids, engine hoods or the like. These closing elements may in principle be configured as pivoting or sliding doors. The motorized locking function relates in particular to a motor vehicle lock assigned to the motor vehicle locking system. Further examples of the locking functions in question of a motor vehicle are drive arrangements that provide motorized adjustment of the abovementioned closing elements.

In the present case, a main boost stage is connected downstream of the energy store, wherein the energy storage voltage is applied to an input of the main boost stage in the emergency operating mode and the main boost stage boosts the energy storage voltage to the emergency supply voltage.

The proposed solution now represents a departure from the concept known from the prior art of mandatorily equipping the energy storage arrangement with multiple series-connected capacitors. The proposed solution here is based on the idea of optimizing the boosting of the energy storage voltage instead of adapting the energy store with regard to the emergency supply voltage.

By using a corresponding main boost stage having a comparatively high boost factor, the capacitor voltage of a single capacitor may already be sufficient for providing the emergency supply voltage. Essential is the idea that although the comparatively high threshold voltage intended to start up the main boost stage potentially may not be able to be provided directly by the energy store, an auxiliary boost stage intended to provide the threshold voltage is used here.

Specifically, it is proposed for an auxiliary boost stage to also be connected downstream of the energy store and to be able to be connected upstream of the main boost stage in such a way that the auxiliary boost stage boosts the energy storage voltage to at least a threshold voltage of the main boost stage, which threshold voltage is intended to start up the main boost stage.

The efficiency when boosting the energy storage voltage can be increased via the intended use of the main boost stage. Although increased demands are placed on the main boost stage here, the auxiliary boost stage can at the same time have a particularly simple and inexpensive construction.

In various embodiment, the auxiliary boost stage is configured differently to the main boost stage, in particular with regard to the boost factor and/or the threshold voltage. The matching of the boost stages accordingly also allows a reduction in the production costs of the control arrangement.

Additionally, in various embodiments, the auxiliary boost stage is used in a dual function for providing the voltage supply to a drive control unit. The auxiliary boost stage can additionally take over the voltage supply to the drive control unit upon receiving an operator control signal, whereby the drive control unit is activated when needed.

In various embodiments, the operation of the main boost stage can additionally be started in a targeted manner upon the presence of the operator control event by the provision of the threshold voltage by means of the auxiliary boost stage.

In various embodiments, the capacitor is in the form of a double-layer capacitor in order to achieve a high electric power density. The design-induced limitation of the maximum capacitor voltage that occurs in double-layer capacitors is not a problem with the proposed solution due to the configuration of the boost stages.

As already mentioned, the proposed control arrangement allows the use of an energy storage arrangement having just one single capacitor. In various embodiments, however, the energy storage arrangement has at least two capacitors connected in parallel with each other. The parallel connection of the capacitors allows the available capacitance to be increased, wherein the capacitor to be used can also be selected with a switching apparatus for redundancy of the energy storage arrangement.

According to various embodiments, a motor vehicle locking system which has an electric drive, having an electric drive motor, and a proposed control arrangement is provided as such. Reference may be made to all statements regarding the proposed control arrangement.

In various embodiments, provision is furthermore made for a motor vehicle lock for the closing element of the motor vehicle, wherein the electric drive is intended for the motorized lifting of the pawl of the motor vehicle lock. The proposed solution may in this case take the special security requirements on motor vehicle locks into consideration.

According to various embodiments, a method for operating a motor vehicle locking system is provided. In this respect, reference may also be made to all statements regarding the proposed control arrangement.

Various embodiments provide a control arrangement for operating a motor vehicle locking system, wherein the motor vehicle locking system has an electric drive having an electric drive motor, wherein during normal operation the electric drive is fed by a normal supply voltage in order to provide a motorized locking function for an adjustable closing element of the motor vehicle in response to an operator control event, wherein the control arrangement has an energy storage arrangement having at least one energy store in the form of a capacitor, wherein in an emergency operating mode, in particular in the event of failure of the normal supply voltage, the energy storage arrangement makes available an electrical energy storage voltage in order to provide an electrical emergency supply voltage to the electric drive, wherein a main boost stage is connected downstream of the energy store, wherein the energy storage voltage is applied to an input of the main boost stage in the emergency operating mode and the main boost stage boosts the energy storage voltage to the emergency supply voltage, wherein an auxiliary boost stage is also connected downstream of the energy store and is able to be connected upstream of the main boost stage in such a way that the auxiliary boost stage boosts the energy storage voltage to at least a threshold voltage of the main boost stage, which threshold voltage is intended to start up the main boost stage.

In various embodiments, the auxiliary boost stage is configured differently to the main boost stage, in particular with regard to the boost factor.

In various embodiments, the auxiliary boost stage has a lower threshold voltage, intended for start-up, than the main boost stage, and in that the threshold voltage of the auxiliary boost stage is less than or equal to a predefined energy storage voltage.

In various embodiments, the control arrangement actuates the drive) by means of a drive control unit and in that the auxiliary boost stage in the emergency operating mode, such as upon receiving an operator control signal representative of an operator control event, provides an electrical supply voltage to the drive control unit.

In various embodiments, the control arrangement, in some embodiments the drive control unit, monitors the presence of the operator control event and if the operator control event is present connects the auxiliary boost stage upstream of the main boost stage in order to provide the threshold voltage of the main boost stage.

In various embodiments, the capacitor is in the form of a double-layer capacitor.

In various embodiments, the energy storage arrangement has a single capacitor or at least two capacitors connected in parallel with each other. In some embodiments, provision is made for a switching apparatus which can be used to switch between two capacitors of the energy storage arrangement for generating the emergency supply voltage.

Various embodiments provide a motor vehicle locking system which has an electric drive, having an electric drive motor, and a control arrangement as provided herein.

In various embodiments, provision is made for a motor vehicle lock for the closing element of the motor vehicle, in that the motor vehicle lock is equipped with a lock latch for holding engagement with a locking part, and a pawl assigned to the lock latch, and in that the electric drive is intended for the motorized lifting of the pawl.

Various embodiments provide a method for operating a motor vehicle locking system, wherein the motor vehicle locking system has an electric drive having an electric drive motor, wherein during normal operation the electric drive is fed by a normal supply voltage in order to provide a motorized locking function for an adjustable closing element of the motor vehicle in response to an operator control event, wherein a control arrangement has an energy storage arrangement having at least one energy store in the form of a capacitor, wherein in an emergency operating mode, in particular in the event of failure of the normal supply voltage, an electrical energy storage voltage is made available by the energy storage arrangement in order to provide an electrical emergency supply voltage to the electric drive, wherein a main boost stage is connected downstream of the energy store, wherein the energy storage voltage is applied to an input of the main boost stage in the emergency operating mode and the energy storage voltage is boosted by the main boost stage to the emergency supply voltage, wherein an auxiliary boost stage is also connected downstream of the energy store and is able to be connected upstream of the main boost stage in such a way that the energy storage voltage is boosted by the auxiliary boost stage to at least a threshold voltage of the main boost stage, which threshold voltage is intended to start up the main boost stage.

BRIEF DESCRIPTION OF THE DRAWINGS

Various aspects will be explained in more detail below with reference to a drawing illustrating merely exemplary embodiments. In the drawing

DETAILED DESCRIPTION

Figure 1:
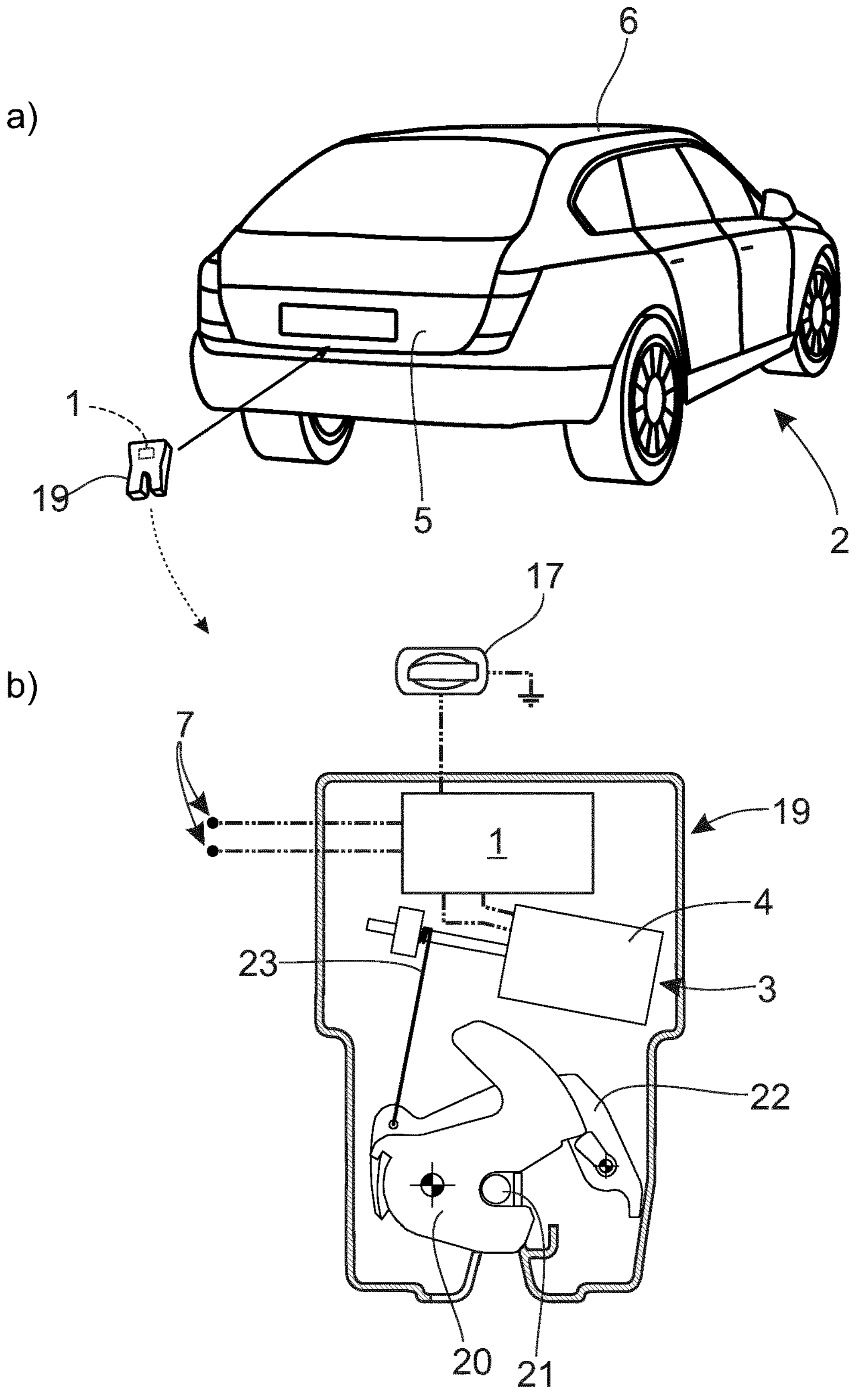
FIG. 1 shows a schematic, perspective illustration of a motor vehicle having a proposed motor vehicle locking system which has a motor vehicle lock, and the motor vehicle lock having a proposed control arrangement in a partially disassembled side view.

According some embodiments, a control arrangement 1, illustrated in FIG. 1, for operating a motor vehicle locking system 2 is provided. The motor vehicle locking system 2 has an electric drive 3 having an electric drive motor 4, wherein during normal operation the electric drive 3 is fed by a normal supply voltage in order to provide a motorized locking function for an adjustable closing element 5 of the motor vehicle 6.

In the present case, the term "drive motor" encompasses all kinds of electric actuators, in particular rotary and linear actuators. The drive motor 4 can be a rotary electric motor which can further be in the form of a brushed DC motor or brushless DC motor. The normal supply voltage used during normal operation is in this case a supply voltage of the on-board power system 7 of the motor vehicle 6, which supply voltage can be provided by the central battery of the motor vehicle 6. The central battery can be the battery that provides the electrical energy required to start the motor vehicle 6 and/or to drive the motor vehicle 6.

A motorized locking function should be understood to mean that the adjustable closing element 5 of the motor vehicle 6 is adjusted, is opened or closed, and/or is locked or unlocked, directly or indirectly by movement generated by the electric drive 3. With regard to the configuration of the closing element 5, reference may be made to the introductory statements, wherein, in the present case in FIG. 1, the functioning of the motor vehicle locking system 2 is illustrated for a closing element 5 in the form of a tailgate. However, all statements likewise apply to all other types of closing elements 5 of the motor vehicle 6.

FIG. 2*a*) and *b*) show further illustrations of the control arrangement 1, wherein for the sake of simplification only components for provision, explained below, of an emergency supply voltage are reproduced. The control arrangement 1 can have an electronic control system for implementing the control tasks that arise in connection with the motorized locking functions. The control arrangement 1 is in particular in this case designed to actuate the electric drive 3.

Figure 2:
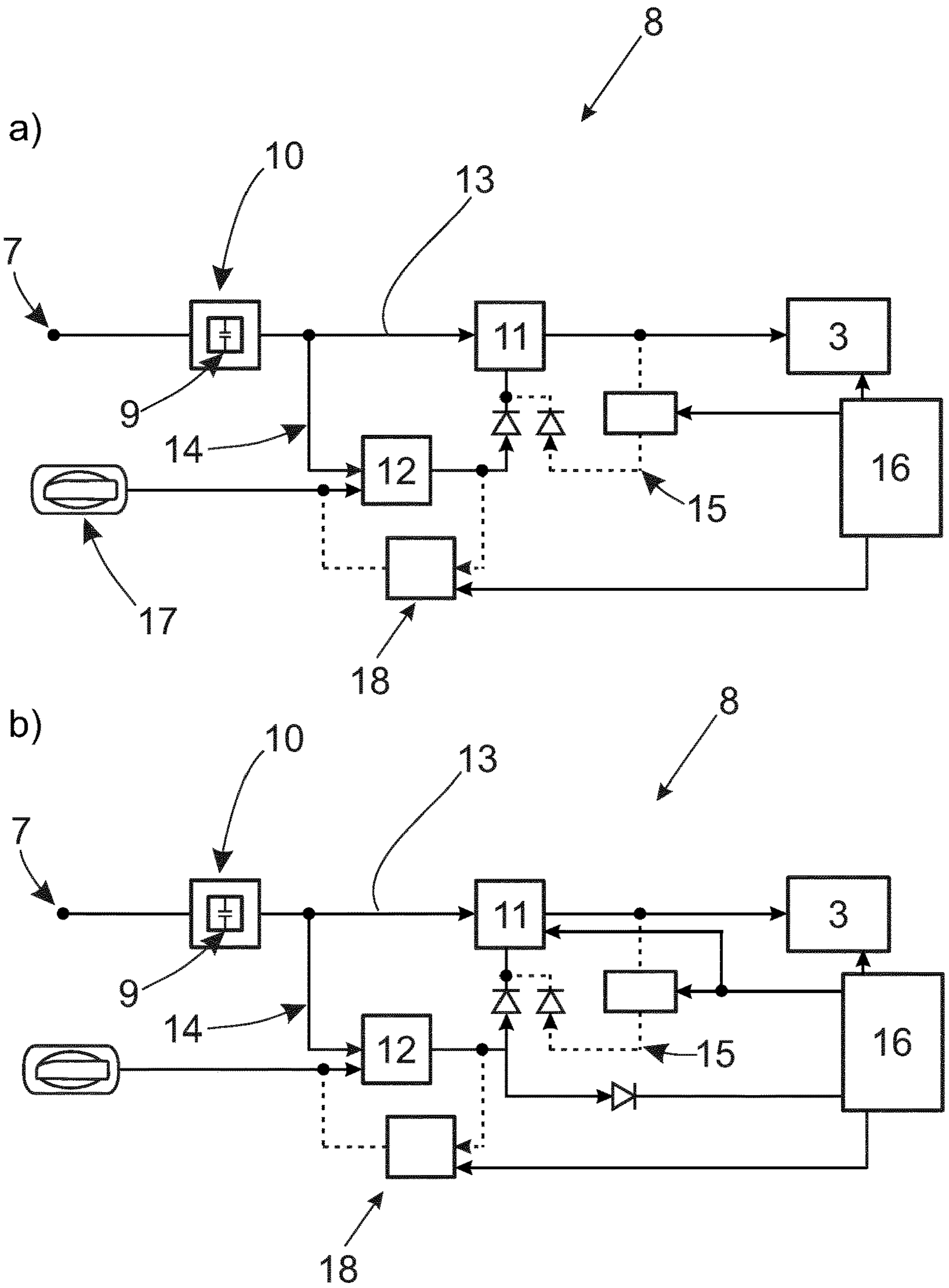
FIG. 2 shows a schematic illustration of the proposed control arrangement a) according to a first configuration and b) according to a second configuration.

As emerges from FIG. 2, the control arrangement 1 has an energy storage arrangement 8 having at least one energy store 10 in the form of a capacitor 9, wherein in an emergency operating mode, in particular in the event of failure of the normal supply voltage, the energy storage arrangement 8 makes available an electrical energy storage voltage in order to provide an electrical emergency supply voltage to the electric drive 3. The emergency supply voltage can be in this case provided based on the capacitor voltage 9 of the at least one capacitor 9, as will be explained further below.

The electric drive 3 is generally matched to the normal supply voltage, and in particular to the voltage of the central battery of the motor vehicle 6, with regard to the required drive voltage. The energy storage voltage is in this case lower than the normal supply voltage. A main boost stage 11 is connected downstream of the energy store 10. The energy storage voltage 10 is applied to an input of the main boost stage 11 in the emergency operating mode. The main boost stage 11 is designed to boost the energy storage voltage 10 to the emergency supply voltage. In various embodiments, the input of the main boost stage 11 is connected or able to be connected directly to the energy store 10 without further electrical components which fundamentally change the electrical voltage at the input of the main boost stage 11 being arranged between the energy store 10 and the main boost stage 11.

What is essential now is that an auxiliary boost stage 12 is also connected downstream of the energy store 10 and is able to be connected upstream of the main boost stage 11 in such a way that the auxiliary boost stage 12 boosts the energy storage voltage 10 to at least a threshold voltage of the main boost stage 11, which threshold voltage is intended to start up the main boost stage 11.

The auxiliary boost stage 12 which is able to be connected upstream of the main boost stage 11 can therefore be used additionally and in a targeted manner to start up the main boost stage 11 in order to ensure operation of the main boost stage 11. The actual boosting of the energy storage voltage to the emergency supply voltage, however, takes place in this case, in some embodiments exclusively, via the main boost stage 11.

FIG. 2*a*) schematically shows a configuration of the control arrangement 1, wherein the main boost stage 11 is connected downstream of the energy store 10 by way of a main line 13. In order to provide the threshold voltage, the auxiliary boost stage 12 is able to be connected upstream of the main boost stage 11 by means of an auxiliary line 14 provided in parallel with the main line 13.

The threshold voltage intended for start-up should be understood to mean an electrical minimum voltage required for normal operation of the main boost stage 11. The threshold voltage intended to start up the main boost stage 11 is in particular intended to operate a switching element, not illustrated, for instance a MOSFET, of the main boost stage 11. Once the main boost stage 11 has been started up, the auxiliary boost stage 12 is in many cases no longer required for operation of the main boost stage 11. In various embodiments, a supply circuit 15 for the main boost stage 11 is provided, which supply circuit enables its own supply to the main boost stage 11 after the start-up.

The auxiliary boost stage 12 and main boost stage 11 may each be constructed in different ways that are known per se. In various embodiments, the auxiliary boost stage 12 and main boost stage 11 are in the form of step-up converters (boost converters).

Furthermore, it can be provided in various embodiments that the auxiliary boost stage 12 is configured differently to the main boost stage 11, in particular with regard to the boost factor. In particular, the auxiliary boost stage 12 can have a particularly simple and inexpensive construction since the auxiliary boost stage 12 with the threshold voltage of the main boost stage 11 only has to provide a lower boost factor.

Furthermore, in various embodiments, the auxiliary boost stage 12 has a lower threshold voltage, intended for start-up, than the main boost stage 11, and that the threshold voltage of the auxiliary boost stage 12 is less than or equal to a predefined energy storage voltage 10.

The predefined energy storage voltage 10 should be understood to mean in particular a minimum voltage of the energy store 10 intended for operation of the control arrangement 1. In particular, the predefined energy storage voltage 10 corresponds to a state of charge of the energy store 10 at which at least one execution of the motorized locking function is still made possible. The auxiliary boost stage 12 can therefore be adapted to match to the respective demands of the energy store 10.

As illustrated in FIG. 2*b*), it can be provided in various embodiments that the control arrangement 1 actuates the drive 3 by means of a drive control unit 16 and that the auxiliary boost stage 12 in the emergency operating mode, such as upon receiving an operator control signal representative of an operator control event, provides an electrical supply voltage to the drive control unit 16.

Furthermore, it can be provided in various embodiments that the control arrangement 1, in various embodiments the drive control unit 16, monitors the presence of the operator control event and if the operator control event is present connects the auxiliary boost stage 12 upstream of the main boost stage 11 in order to provide the threshold voltage of the main boost stage 11.

The drive control unit 16 in particular has control logic which for example triggers the actuation of the drive 3 when the operator control event is present, for instance when predefined operator control criteria have been met. The drive control unit 16 can be in the form of a microcontroller. For example, upon receiving an operator control signal, the drive control unit 16 checks whether the currently present locking state allows the triggering of the motorized locking function. In this case, a door handle 17 is equipped with a sensor or the like which detects actuation of the door handle 17 and forwards the detection, via a control connection, to the control arrangement 1 in the form of an actuation signal. However, the motorized locking function is only triggered for example when the motor vehicle locking system 2 is in the locking state "unlocked".

The supply to the drive control unit 16 by means of the auxiliary boost stage 12 can reduce the energy expenditure in the emergency operating mode since the main boost stage 11 is not mandatorily used for supplying the drive control unit 16.

The auxiliary boost stage 12 here is activated by receiving the operator control signal. In various embodiments, provision is made for a self-holding circuit 18 for the auxiliary boost stage 12, which can further be deactivated by the drive controller 3, for example if the check for the presence of the operator control event turns out to be negative.

Furthermore, it can be provided in various embodiments that the capacitor 9 is in the form of a double-layer capacitor. A double-layer capacitor is an electrochemical energy store 10. The energy is stored in an electrochemical double layer which is also known as a "Helmholtz layer". Such a double-layer capacitor is also referred to as a "supercapacitor", "supercap", "ultracap" or the like. A double-layer capacitor is able to provide a high power density for the motor vehicle locking system 2.

The maximum voltage provided by the capacitor 9 for the capacitor voltage is in particular at most 3 V, in particular at most 2.7 V. The emergency supply voltage may in particular be an order of magnitude above the maximum voltage for the capacitor voltage. The emergency supply voltage is in particular at least 10 V. The boost factor of the main boost stage 11 can be at least 2, or at least 5.

According to various embodiments, the energy storage arrangement 8 has a single capacitor 9, in particular a single double-layer capacitor. As already mentioned, the proposed solution makes it possible, via the main boost stage 11, even with the in this case correspondingly low capacitor voltage, to guarantee the provision of the emergency supply voltage.

Alternatively, it is provided that the energy storage arrangement 8 has at least two capacitors 9 connected in parallel with each other. In some embodiments, provision is made for a switching apparatus which can be used to switch between two capacitors 9 of the energy storage arrangement 8 for generating the emergency supply voltage.

It is therefore possible to provide an increased capacitance in comparison with one capacitor 9. In a further, particularly simple configuration, provision is made for the capacitors 9 to be permanently connected in parallel with each other such that the full capacitance is always made available in the emergency operating mode.

Provision can likewise be made for a switching apparatus, not illustrated, which can be used to switch between two capacitors 9 of the energy storage arrangement 8. The switching apparatus may in particular switch the capacitors 9 based on the state of charge of the capacitors 9 and, for example, select the capacitor 9 with the higher state of charge. It is also conceivable for a second capacitor 9 to be selected when the state of charge of a first capacitor 9 falls below a minimum value.

According to a further configuration, not illustrated, the control arrangement 1 is designed to charge the energy store 10. In this case the energy storage arrangement 8 can have at least one buck stage which is connected upstream of the energy store 10 for charging the energy store 10 via the normal supply voltage. The buck stage steps down an electrical input voltage at an input of the buck stage into an electrical output voltage at an output of the buck stage. It is conceivable for the energy storage arrangement 8 to have a first buck stage connected upstream of the energy store 10 for charging the energy store 10 and a second buck stage connected downstream of the first buck stage. In this case, the buck stages may for example have an identical or different design.

Also provided according to various embodiments, is a motor vehicle locking system 2 which has an electric drive 3, having an electric drive motor 4, and a control arrangement 1 as provided herein. In this respect, reference may be made to all above statements.

Furthermore, it can be provided in various embodiments that provision is made for a motor vehicle lock 19 for the closing element 5 of the motor vehicle 6. The motor vehicle lock 19 is illustrated in a partially disassembled side view in FIG. 1 and is equipped with a lock latch 20 able to pivot about a lock latch axis 20, for holding engagement with a locking part 21, and a pawl 22 assigned to the lock latch 20 and able to pivot about a pawl axis 22. The locking part 21 may be a locking bracket, a locking bolt or the like. By way of example, the motor vehicle lock 19 is arranged on a closing element 5, while the locking part 21 is arranged fixed on the body of the motor vehicle 6.

The pawl 22 is able to be brought into a dropped position, illustrated in FIG. 1, in which it holds the lock latch 20 in the illustrated locked position. The pawl 22 is further able to be lifted in a motorized manner by means of the electric drive 3. For this purpose, the drive motor 4 can be connected to the pawl 22 by a drive cable 23. The motorized lifting of the pawl 22 in FIG. 1 is a pivoting of the pawl 22 clockwise about the pawl axis 22. The pawl 22 may in principle also be part of a pawl system 22 consisting of two or more sequentially arranged pawls 22 and assigned to the lock latch 20. The motorized lifting of the pawl 22 is triggered for example by the actuation of the door handle 17.

In addition to or instead of the locking function of the motor vehicle lock 19 explained in more detail here, the motor vehicle locking system 2 may likewise have a drive arrangement 3 for the motorized adjustment of an above-mentioned closing element 5 of the motor vehicle 6, wherein the drive arrangement 3 is used for the motorized adjustment, in particular opening and/or closing, of the closing element 5. Further examples of locking functions are motorized adjustment of operator control elements such as operator control levers, door handles 17, and of interior elements and exterior elements of the motor vehicle 6, such as fan elements, interior mirrors, side mirrors, lighting or the like.

Also provided according to various embodiments, is a method for operating a motor vehicle locking system 2, wherein the motor vehicle locking system 2 has an electric drive 3 having an electric drive motor 4, wherein during normal operation the electric drive 3 is fed by a normal supply voltage in order to provide a motorized locking function for an adjustable closing element 5 of the motor vehicle 6 in response to an operator control event, wherein a control arrangement 1 has an energy storage arrangement 8 having at least one energy store 10 in the form of a capacitor 9, wherein in an emergency operating mode, in particular in the event of failure of the normal supply voltage, an electrical energy storage voltage 10 is made available by the energy storage arrangement 8 in order to provide an electrical emergency supply voltage to the electric drive 3, wherein a main boost stage 11 is connected downstream of the energy store 10, wherein the energy storage voltage 10 is applied to an input of the main boost stage 11 in the emergency operating mode and the energy storage voltage 10 is boosted by the main boost stage 11 to the emergency supply voltage.

Essential now is that an auxiliary boost stage 12 is also connected downstream of the energy store 10 and is able to be connected upstream of the main boost stage 11 in such a way that the energy storage voltage 10 is boosted by the auxiliary boost stage 12 to at least a threshold voltage of the main boost stage 11, which threshold voltage is intended to start up the main boost stage 11. With respect to the proposed method, reference is also made to all statements regarding the other teachings.

The invention claimed is:

1. A control arrangement for operating a motor vehicle locking system, wherein the motor vehicle locking system comprises an electric drive comprising an electric drive motor, wherein during normal operation the electric drive is fed by a normal supply voltage in order to provide a motorized locking function for an adjustable closing element of the motor vehicle in response to an operator control event, wherein the control arrangement comprises an energy storage arrangement comprising at least one energy store in the form of a capacitor, wherein in an emergency operating mode, the energy storage arrangement makes available an electrical energy storage voltage in order to provide an electrical emergency supply voltage to the electric drive, wherein a main boost stage is connected downstream of the energy store, wherein the energy storage voltage is applied to an input of the main boost stage in the emergency operating mode and the main boost stage boosts the energy storage voltage to the emergency supply voltage, wherein an auxiliary boost stage is also connected downstream of the energy store and is able to be connected upstream of the main boost stage in such a way that the auxiliary boost stage boosts the energy storage voltage to at least a threshold voltage of the main boost stage, which threshold voltage is intended to start up the main boost stage wherein the control arrangement monitors the presence of the operator control event and if the operator control event Is present, connects the auxiliary boost state upstream of the main boost stage in order to provide the threshold voltage of the main boost stage.

2. The control arrangement as claimed in claim 1, wherein the auxiliary boost stage is configured differently to the main boost stage.

3. The control arrangement as claimed in claim 1, wherein the auxiliary boost stage has a lower threshold voltage, intended for start-up, than the main boost stage, and wherein the threshold voltage of the auxiliary boost stage is less than or equal to a predefined energy storage voltage.

4. The control arrangement as claimed in claim 1, wherein the control arrangement actuates the drive by a drive control unit and wherein the auxiliary boost stage in the emergency operating mode provides an electrical supply voltage to the drive control unit.

5. The control arrangement as claimed in claim 1, wherein the capacitor is in the form of a double-layer capacitor.

6. The control arrangement as claimed in claim 1, wherein the energy storage arrangement comprises a single capacitor or at least two capacitors connected in parallel with each other.

7. A motor vehicle locking system which comprises an electric drive, comprising an electric drive motor, and a control arrangement as claimed in claim 1.

8. The motor vehicle locking system as claimed in claim 7, wherein provision is made for a motor vehicle lock for the closing element of the motor vehicle, wherein the motor vehicle lock is equipped with a lock latch for holding engagement with a locking part, and a pawl assigned to the lock latch, and wherein the electric drive is intended for the motorized lifting of the pawl.

9. A method for operating a motor vehicle locking system, wherein the motor vehicle locking system comprises an electric drive comprising an electric drive motor, wherein during normal operation the electric drive is fed by a normal supply voltage in order to provide a motorized locking function for an adjustable closing element of the motor vehicle in response to an operator control event, wherein a control arrangement comprises an energy storage arrangement comprising at least one energy store in the form of a capacitor, wherein in an emergency operating mode an electrical energy storage voltage is made available by the energy storage arrangement in order to provide an electrical emergency supply voltage to the electric drive, wherein a main boost stage is connected downstream of the energy store, wherein the energy storage voltage is applied to an input of the main boost stage in the emergency operating mode and the energy storage voltage is boosted by the main boost stage to the emergency supply voltage, wherein an auxiliary boost stage is also connected downstream of the energy store and is able to be connected upstream of the main boost stage in such a way that the energy storage voltage is boosted by the auxiliary boost stage to at least a threshold voltage of the main boost stage, which threshold voltage is intended to start up the main boost stage wherein the control arrangement monitors the presence of the operator control event and if the operator control event is present, connects the auxiliary boost state upstream of the main boost stage in order to provide the threshold voltage of the main boost stage.

10. The control arrangement as claimed in claim 1, wherein in an emergency operating mode is in response to an event of failure of the normal supply voltage.

11. The control arrangement as claimed in claim 1, wherein the auxiliary boost stage is configured differently to the main boost stage with regard to the boost factor.

12. The control arrangement as claimed in claim 1, wherein the control arrangement actuates the drive by a drive control unit and in that the auxiliary boost stage in the emergency operating mode, upon receiving an operator control signal representative of an operator control event, provides an electrical supply voltage to the drive control unit.

13. The control arrangement as claimed in claim 6, wherein provision is made for a switching apparatus which can be used to switch between two capacitors of the energy storage arrangement for generating the emergency supply voltage.

14. The method for operating a motor vehicle locking system as claimed in claim 9, wherein in an emergency operating mode is in response to an event of failure of the normal supply voltage.

* * * * *